United States Patent [19]
Talley et al.

[11] Patent Number: 5,396,950
[45] Date of Patent: Mar. 14, 1995

[54] APPARATUS & METHODS FOR HORIZONTAL COMPLETION OF A WATER WELL

[76] Inventors: Robert R. Talley, 1806 Crutchfield, Katy, Tex. 77449; David L. Moseley, 14128 Apple Tree La., Houston, Tex. 77079

[21] Appl. No.: 247,677

[22] Filed: May 23, 1994

Related U.S. Application Data

[62] Division of Ser. No. 962,870, Oct. 19, 1992, Pat. No. 5,343,965.

[51] Int. Cl.6 .................... E21B 33/00; E21B 43/00
[52] U.S. Cl. .......................... 166/50; 166/242; 175/73
[58] Field of Search ............... 166/50, 100, 242; 175/61, 62, 73

[56] References Cited

U.S. PATENT DOCUMENTS 4,714,117 12/1987 Dech .................. 166/50 X
5,107,927 4/1992 Whiteley et al. ........... 166/50

*Primary Examiner*—Michael Powell Buiz
*Attorney, Agent, or Firm*—Bush, Moseley, Riddle & Jackson

[57] ABSTRACT

Methods and apparatus combinations for making a substantially horizontal water well completion for irrigation or commercial water supply purposes includes running a substantially vertical surface string of casing, running a bend section of casing that has been preformed to provide a bend angle of about 90° in a straightened-out condition down through the surface section and allowing it to assume its bend condition below the lower end of the surface section, coupling the upper end of the bend section to the lower end of the surface section, running a water production section of casing through both the surface and bend sections and outward horizontally into the aquifer, and either coupling the inner end thereof to the outer end of the bend section, or extending the production section all the way to the surface. Unique coupling mechanisms, running and retrieving tools and other devices also are disclosed.

12 Claims, 3 Drawing Sheets

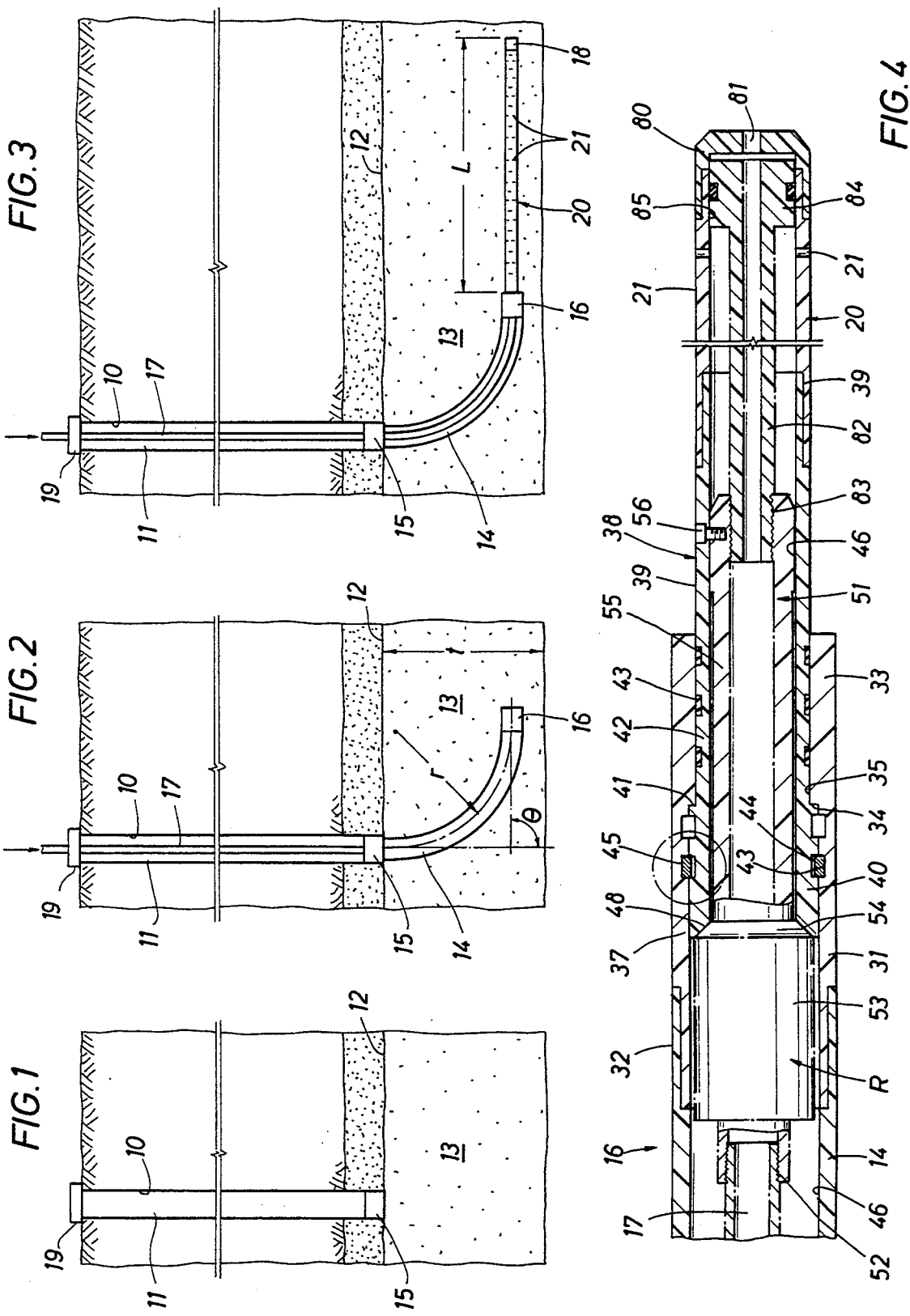

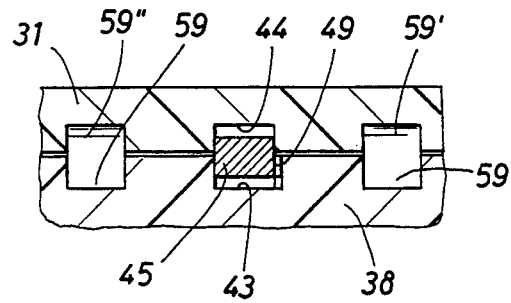
FIG. 4A
FIG. 4B
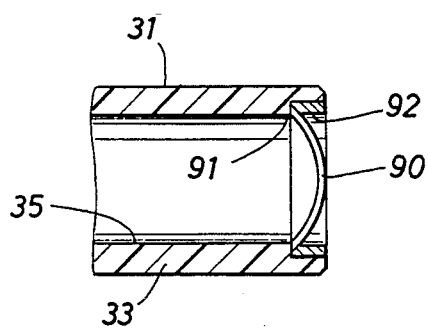
FIG. 6
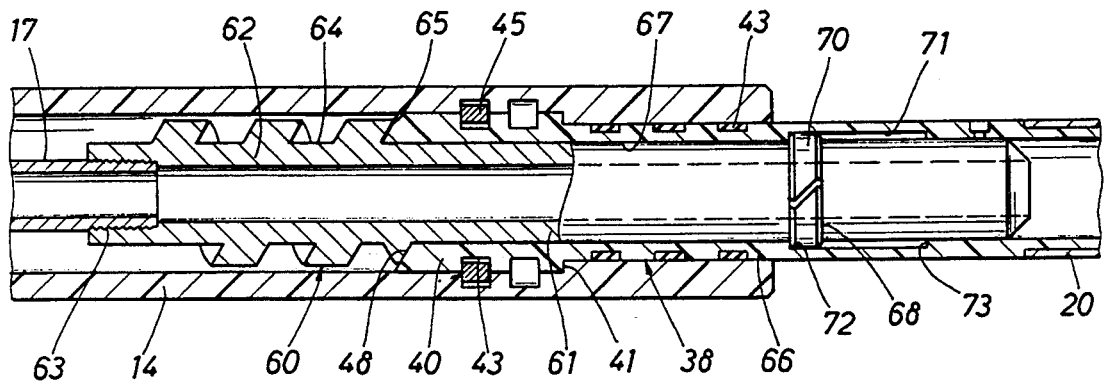
FIG. 5

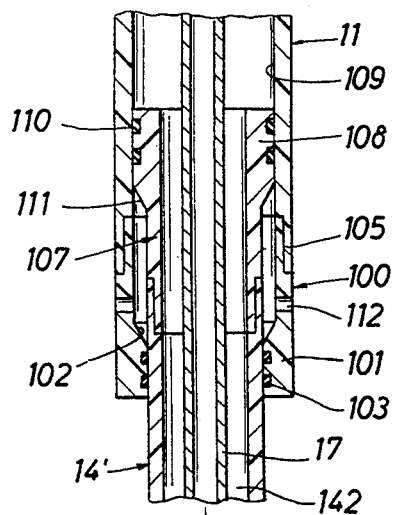
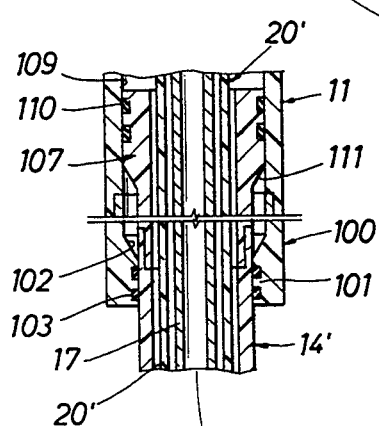
FIG. 7
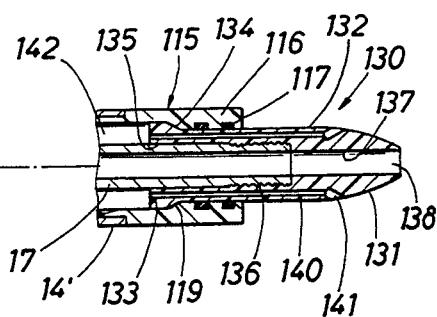
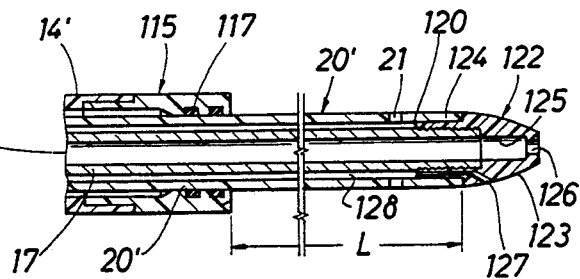
FIG. 8

APPARATUS & METHODS FOR HORIZONTAL COMPLETION OF A WATER WELL

CROSS-REFERENCE TO RELATED APPLICATION

This application is related to U.S. application Ser. No. 07/888,007, filed May 26, 1992, on behalf of Robert R. Talley, and entitled "Water Well Completion Method" and is a division of application Ser. No. 07/962,870, filed Oct. 19, 1992, now U.S. Pat. No. 5,343,965.

FIELD OF THE INVENTION

This invention relates generally to methods and apparatus by which a high productivity water well of the type that is useful for agricultural irrigation or commercial or municipal utility district water production is cased and put on production, and particularly to methods and apparatus for casing such a water well so that the water production section thereof extends horizontal, or near horizontal to greatly increase the flow rate at which the well can be produced.

BACKGROUND OF THE INVENTION

As explained in the above-referenced application Ser. No. 07/888,007, which is incorporated herein by express reference, aquifers such as the Ogallala which provide water that is essential to the economics of a large part of the Midwest and Southwest regions of the United States, have experienced substantial reductions in water saturated thickness for many years. Some areas reached critical saturation thickness, where pumping causes air breakthrough and severe damage to pumping equipment, as far back as 1956. To provide adequate water supplies, additional wells have been drilled and completed, at drilling and completion costs, and with additional power requirement costs that have made the economics of such additional wells questionable.

In the above-mentioned application for patent, methods are disclosed and claimed for forming the borehole of a water well in a manner such that its lower or production section extends horizontal, or hear horizontal, and preferably is positioned in the lower 20% of the water-saturated thickness of an aquifer. Where the aquifer is unusually thick, such production section should be positioned at a depth below the air-water interface of such aquifer which is adequate to prevent air breakthrough during pumping, and which limits the lift distance together with associated power requirements. Such a completion allows high pumping rates with greatly reduced possibilities of air breakthrough, and also permits a much larger volume of the aquifer to be produced by a single well. The present application is directed to unique casing installation systems and associated tools by which the methods disclosed in the prior application are carried out.

SUMMARY OF THE INVENTION

The present invention provides methods and apparatus used in connection with the installation of a casing system in a high productivity water well. A first or surface section of pipe is run into a previous drilled well bore that extends down to at least the top of the aquifer, and preferably down to the level of the air-water interface of the aquifer. This section can be either plastic or metal, and can have a diameter of about 13⅜ inches, as an example. The surface section has a coupling member on its lower end which provides a stop shoulder and a latch member, and also can include a seal bore. The next section of the casing that is run is preformed in its manufacture to provide a near 90° bend on a predetermined radius of curvature when this section is in its relaxed state, and is preferably made of a material such as polyvinyl chloride, or a modified crosslink polyethylene having a relatively high elasticity so that it can be readily straightened out as it is run through the vertical bore of the surface section. This bend section has a lesser diameter than the surface section, and can be 11½ inches in diameter, for example. The bend section has coupling members at its upper and lower ends, and the upper member includes components that cooperate with the coupling member on the lower end of the surface section to provide a latched and sealed connection. As the bend section emerges from the lower end of the surface section, it returns to its preformed, relaxed state whereby its outer end projects substantially horizontally. A small diameter string of pipe having a running tool on its lower end is used to push the bend section through the surface section, and after the coupling is achieved, which occurs automatically, the running string and tool are removed from the well. The radius of curvature of the bend section preferably is such that the outer end thereof is located within the lower 20% of the water saturated thickness of the aquifer.

In the final phase of the casing installation, a water production section of casing, which has a smaller diameter than the bend section, for example 10 inches, is run through the surface section and around the bend section so that it projects from the outer end thereof, i.e. substantially horizontally. This section has perforations or slots along the length thereof for the entry of water from the aquifer. The production section also is run with the small diameter running string and a running tool so that it can be pushed through the bend section and out the outer end thereof. When the inner end of the production section reaches the outer end of the bend section, respective coupling members like those mentioned above, except smaller in size, engage to stop outward movement and to automatically provide a latched and sealed connection. The running tool then is released, and the string and tool are removed from the well. An electric submersible pump or the like now can be installed, and the water well put on production.

Where the aquifer is sufficiently unconsolidated in its water saturated thickness, the lower end portion of the surface section, the entire bend section and the entire production section can be positioned by downward axial force applied at the surface, or "snubbing". If the water saturated sand has sufficient consolidation, the positioning of these sections can be accomplished through jetting of the water out their lower ends, together with the application of downward axial force at the surface.

Where it may be desirable to remove the production section, for instance to substitute a longer or a shorter section, or the bend section to substitute one with a different radius of curvature, a releasing tool is provided which disables the automatic latch in the coupling members and catches the adjacent end of the section that is to be removed so that it can be pulled upward to the surface through the section or sections of casing thereabove. Reinstallation is accomplished by use of the same techniques and apparatus described above. Unique automatic coupling assemblies, and running and retrieving tools, also are disclosed.

In an alternative embodiment of the present invention, the bend section is emplaced by using the running string to push on the lower end of the bend section, via a retrievable torpedo-shaped jetting tool, while pumping water under pressure through the running string to jet the lower end of the bend section down. The bend section has a sub at its upper end which seals against the wall of the casing section. This sub need not be down against the shoulder on the lower end of the casing section when an inclination survey shows that the lower end of the bend section is projecting substantially horizontal. The production section then is run by also pushing on its lower or outer end with the running string while jetting water out a nozzle at the end thereof. This production string extends all the way to the surface, rather than from the outer end of the bend section as in the previous embodiment. The well can be put on high flow rate production after the running string is removed.

BRIEF DESCRIPTION OF THE DRAWING

The present invention has various objects, features and advantages which will become more clearly apparent in connection with the following detailed description of a preferred embodiment, taken in conjunction with the appended drawings in which:

FIGS. 1–3 are schematic illustrations showing the various phases of the casing installation method in accordance with the present invention;

FIG. 4 is a longitudinal cross-sectional view of a automatic coupling mechanism that is used to secure the adjacent end portions of the casing sections to one another, together with a running tool which is shown in phantom lines and a wash pipe shown in dash-dot-dash lines which can be used under certain circumstances to run the production section;

FIG. 4A is an enlarged, fragmentary cross-sectional view showing an automatic latch means that is a component part of the coupling mechanism;

FIG. 4B is a view similar to FIG. 4A of an alternative embodiment of an automatic latch means;

FIG. 5 is a view similar to FIG. 4 of a retrieving tool that is used to release the automatic latch shown in FIGS. 4A or 4B and to catch the next lower casing section so that it can be removed from the well;

FIG. 6 is a fragmentary sectional view of a fragile disc valve that can be used on the outer end of the bend section as it is run; and FIGS. 7 and 8 show another embodiment of a casing installation method in accordance with this invention.

DETAILED DESCRIPTION OF PREFERRED EMBODIMENTS

FIG. 1 shows a wellbore 10 which is lined with a vertical, or near vertical, surface casing section 11 which can be an assembly of individual plastic or metal joints that are connected end-to-end. As previously noted, the section 11 can have a diameter of about 13⅝ inches, and is hung off in a typical wellhead 19. It is preferred that the bottom of the surface section 11 be located at a depth that is approximately the level of the air-water interface 12 in the aquifer 13, which has been depleted above such interface. An outer sub included in a coupling mechanism 15, to be described in detail below, is attached to the lower end of the surface section 11 before it is lowered. From the level of the interface 12, the well is lined by a bend section 14 (FIG. 2) which is made of a relatively resilient, plastic material such as PVC/PE which has a diameter that is smaller than the diameter of the surface section 11, for example 11½ inches. The bend section 14 has an inner sub at its upper end which seats in the outer sub at the lower end of the surface section 11, and extends from the coupling mechanism 15 to another outer sub at its outer end which is included in the coupling mechanism 16. The coupling mechanism 16 is shown in FIG. 4, and is like the coupling 15, but to a smaller scale. The section 14 forms a bend of approximately 90° so that the longitudinal axis of the coupling mechanism 16 is directed substantially horizontally. The bend section 14 is preformed in manufacture to provide a desired radius of curvature r, which generally is dependent upon the water saturated thickness t of the aquifer 13, and the distance above its bottom where the outer end of the section 14 should be located. In a preferred completion, the coupling mechanism 16 is located in the bottom 20% of the water saturated thickness t of the aquifer 13 or where the aquifer is unusually thick at a distance below the top of the saturated aquifer to minimize lift costs.

The bend section 14 can be a single length of plastic pipe, or an assembly of individual joints threaded or glued end-to-end. In the later case each joint is preformed in its manufacture to the desired radius of curvature r so that it provides a sector of the total bend length. Where individual joints are used, scribe marks (not shown) are employed at the opposite ends of each joint which are aligned as connections are made at the surface so that the bend section 14, when in place, lies in a single vertical plane. As a further alternative, several individual joints having a preformed radius of curvature can be properly aligned and joined together at the surface, and a plurality of such joint assemblies can be run end-to-end and aligned and connected with reference to scribe marks at the adjacent ends thereof. Since the bend section 14 is temporarily straightened out as it is run down through the surface section 11, it is pushed down through the surface section using a small diameter string of pipe 17 shown in FIG. 2 which can be snubbed by suitable means into the well at the surface. The running string 17 can have a diameter of about ¾–1", or somewhat larger, and include a plurality of plastic or metal pipe joints. Once the coupling mechanism 15 is engaged, the running tool is released and it and the running string 17 are raised to the surface.

The third phase of the casing installation method is shown in FIG. 3. Here the water production section 20, which preferably also is an assembly of plastic pipe joints having an exemplary diameter of about 10 inches, is run down through the surface section 11 and the bend section 14 on the running string 17, so that the production section projects generally horizontally a distance L from the coupling mechanism 16 at the outer end of the bend section. The production section 20 has a large number of fairly small perforations or slots 21 along its length for the entry of water, which usually will been formed during manufacture of these joints. The outer end of the production section 20 can be closed by a bull plug 18, or by a plug having a jetting nozzle for purposes to be described below. Of course the particular casing section diameters mentioned above are merely exemplary, and many other combinations of larger, intermediate and smaller sizes can be employed.

Referring now to FIG. 4 for the structural details of the coupling mechanism 16 at the outer end of the bend section 14, which is identical to the coupling mechanism 15 except to a smaller scale, a tubular mandrel 31 which is connected at 32 to the lower end of the bend section 14 is formed with a reduced inner diameter lower portion 33 which provides an upwardly facing stop or "no-go" shoulder 34. The mandrel or sub 31 can be made out of a high density plastic stock, or metal. The inner surface 35 of the portion 33 provides a seal or "polish" bore. An automatic latch, which is shown in enlarged detail in FIG. 4A, includes an internal annular recess or groove 44 that is formed in the upper portion 37 of the mandrel 31 at a selected distance above the shoulder 41. Another tubular sub 38 which is connected at 39 to the adjacent end of the production section 20 has an enlarged diameter upper portion or head 40 which forms the outwardly facing shoulder 41, and a reduced diameter lower portion 42 that carries one or more seal rings 43 which engage the bore surface 35 of the portion 33 to prevent fluid leakage. The sub 38 preferably is made out of a high density plastic material. An external annular recess or groove 44 which is formed in the outer periphery of the head 40 receives a split snap ring 45 (either plastic or metal) which is held in a retracted position almost totally within the groove 43 by the inner walls 46 of the bend section 14 as the mandrel 38 is run therethrough. When the stop shoulders 34, 41 engage as shown in FIG. 4 to prevent further longitudinal movement of the mandrel 38, the grooves 43 and 44 are radially aligned so that the snap ring 45 resiles outward to partially occupy both grooves and thereby latch the subs 31 and 38 together. The ring 45 has a castellation 49 that engages a radial groove 50 to prevent rotation of the ring for purposes to be described below. The head 40 has an inclined surface 48 at its inner end which functions to guide the outer end of the production section 20 into its bore 46 as the production string is run.

An alternative embodiment of a suitable latch ring means is shown in FIG. 4B. The outer sub 31' that is connected to the outer end of the bend section 14 has, like in the previous embodiment, an internal annular recess or groove 44'. A split snap ring 45' is positioned with its outer portion in the groove 44'. A clearance between the outer wall of the ring 45' and the back wall of the groove 44' allows the ring to be expanded to a larger diameter. The inner sub 38' has an inclined stop shoulder 34' which abuts a companion inclined shoulder 41' on the outer sub 31' when the inner sub is seated therein. The snap ring 45' has an inclined surface 30 that is engaged by the shoulder 41' during seating to cause the ring to be expanded outward until it allows the shoulder 41' to pass by. As in the previous embodiment, the inner sub 38' has an external annular groove 43' which is radially aligned with the groove 44' when the shoulders 34', 41' engage to stop longitudinal movement. At this point the ring 45' contacts or resiles inward partially into the groove 43' to latch the subs 31' and 38' to one another. The snap ring 45' also has a radial castellation 49' on its side opposite the inclined surface 30 which engages in a radial groove 50 in the corresponding side of the groove 44' to prevent rotation of the snap ring within the groove 44'. One or more spaced sets of radially aligned grooves 59, 59' also can be provided in each embodiment, as shown in FIGS. 4A and 4B, for purposes to be described below.

As shown in dash lines in FIG. 4, a running tool indicated generally at R includes a tubular mandrel 51 which is connected at 52 to the lower end of the small diameter running string 17 to enable the production section 20 to be lowered through the casing section 11 and then pushed through the bend section 14. Such pushing is necessary because the production section 20 must travel around the curve provided by the bend section 14, so that friction forces are created which must be overcome. As mentioned above, the pushing force is generated at the surface by "snubbing" the small diameter running string 17, that is, by applying downward axial force to it through use of typical snubbing equipment. The mandrel 51 has an enlarged diameter annular head 53 at its upper end whose lower surface also is chamfered at 54 to match the chamfer 48 on the outer end of the mandrel 38, and a reduced diameter lower portion 55 which is sized to fit within the bore 46 of the mandrel. The lower portion 55 is releasably connected to the mandrel 38 by a shear screw 56 or similar device. Once the snap ring 45 enters an inner portion of the groove 44 to lock the subs together, tension force applied to the running string 17 at the surface causes the screw 56 to shear off and release the running tool R from the mandrel 38.

The use of a similar shear screw in the upper coupling mechanism 15 enables the sub 31 at the lower end of the bend section 14 to point horizontally at a particular compass direction or heading within the aquifer 13. To provide a particular heading, if needed, scribe marks (not shown) on each of the connections at the ends of the joints that make up the running string 17 are aligned with one another, and with respect to the shear screw 56, so the bend section 14 will emerge from the lower end of the surface section 11 headed in the selected direction.

As noted above the coupling mechanism 15 which joins the upper end of the bend section 14 to the lower end of the casing section 11 is constructed exactly as shown in FIG. 4 except for being scaled upward to a larger size, and thus is not illustrated for purposes of simplification of this specification. The same small diameter running string 17 can be used to run the bend section 14, but with a larger size running mandrel connected to its lower end, since the bend section 14, which is normally curved, must be pushed down into the surface section 11 to straighten it out as it is inserted into the top of the casing section. The tendency of the preformed bend section 14 to return to the curvature shown in FIGS. 2 and 3 will generate friction forces that are overcome in the manner described. Hereagain, once the automatic latch engages, a screw like 56 is sheared off by upward force on the running string 17 to allow the running string and the running tool to be removed from the well.

FIG. 5 shows a means by which the production section 20, and later the bend section 14, can be retrieved or pulled back to the surface if the need arises. A releasing tool indicated generally at 60 includes a tubular mandrel 61 having an enlarged diameter upper head 62 which is attached to the running string 17 by threads 63. The outer periphery of the head 62 is provided with spiral grooves 64 and cutting edges 65 which form a twist drill or cutter that will engage the upper portion 40 of the inner mandrel 38 when the lower portion 66 of the mandrel 61 has fully entered the bore 67 of the inner mandrel 38. An external annular recess or groove 68 near the lower end of the portion 66 carries another split latch ring 70 which is contracted into its groove by the chamfer 48 at the upper end of the mandrel head 40 when the lower portion 66 of the mandrel 61 is pushed into the bore 67 of the mandrel 38. Although not shown in FIG. 4, an elongated internal annular groove 71 is formed below the seal rings 43 in the lower portion 66 of the mandrel 38, and provides opposite end faces 72, 73. When the lower cutting edges of the twist drill engage the chamfered surface 48, the snap ring 70 will have resiled out into the upper portion of the groove 71 in order to catch the inner end of the production section 20. Then the running string 17 is rotated to the right to drill away most all of the inner portion of the head 40, as well as the inner portion of the locking ring 45 which is engaged in the groove 43. During such drilling, the shoulder 41 engages the shoulder 34 to provide support. Interengaged, v-shaped castellations (not shown) projecting from the shoulders 41 and 34 can be employed if rotation of the mandrel 38 during drilling, is deemed to be a problem. The engagement of the castellation 49, in the radial slot 50 (FIG. 4A) prevents the snap ring 45 from rotating so that its inner portion can be readily drilled away. As such drilling occurs, the snap ring 70 advances outward in the groove 71. Once the inner part of the latch ring 45 no longer exists, the snap ring 70 will engage the end surface 73 of the groove 71 to stop further outward movement of the drill. Then the mandrel 61 is moved rearward, or to the left as shown in FIG. 5, by the running string 17 to cause the snap ring 67 to engage the opposite end face 72 of the groove 70 and thereby pull the production section 20 through the bore of the bend section 14 and on up to the surface as the running string 17 is removed from the well. As mentioned earlier, one reason for removal of the production section 20 is to permit its replacement by a longer or shorter section, or for repair, or for replacement or change-out of a screen, or for replacement with a section having a different number and/or size of entry ports 21, or if the well is to be abandoned, or for any other reason. Once the production section 20 has been removed, the bend section 14 can be removed, if needed, by using the same techniques described above except for use of a larger size retrieving tool. Removal of the bend section 14 may be desirable in order to insert a replacement having a different radius of curvature which will position the production section 20 higher or lower in the aquifer. It also may be desirable at a future time to replace the bend and production sections with smaller size pipe.

As explained above, if the bend section 14 needs to be jetted into place as it emerges from the bottom of the casing section 11, water under pressure is pumped down through the running string 17, through the bore of its running tool R and the bore of the bend section 14 where the water jets out of the lower end thereof as it is pushed through the casing section 11 and into the position shown in FIG. 2. The right side of FIG. 4 shows in dash-dot-dash lines how the production string 20 also can be jetted into place. The outer end of the production string 20 is capped by a plug 80 having a central nozzle opening 81. A plastic wash pipe 82 is threaded or otherwise connected to the outer end of the running tool R at 83 and extends to an outwardly directed flange 84 that is sealed within a bore 85 adjacent the plug 80. As the production section 20 is being pushed out of the outer end of the bend section 14, water under pressure is pumped down the running string 17, the respective bores of the running tool R and the wash pipe 82, and the out-through nozzle 81 where it jets away the sand ahead of the plug 80. When positioning of the production section 20 is completed, so that the snap ring 45 resiles outward into the groove 44 and latches the subs 31 and 38 together, an upward pull on the running string 17 at the surface will shear the screw 56 and enable the running string, the running tool R and the wash pipe 82 attached to the lower end thereof to be removed from the well.

To practice the processes and to use the apparatus of the present invention as described above, the well bore 10 is drilled vertically downward until it reaches the top of the aquifer 13. From this level, additional drilling can take the borehole down to the level of the air-water interface 12 if the sand is sufficiently consolidated that it does not readily cave in. If caving is deemed to be a problem, the lower portion of the surface section 11 can be jetted down by pumping water under pressure through its bore until the coupling sub on the lower end thereof is at, or very near to, the interface 12. Then the surface section 11 is hung off by appropriate means from the wellhead 19.

Then the bend section 14, having a lower coupling sub designed like element 31 in FIG. 4 attached to its lower end, but larger in size, is run into the top of the surface section 11. The preformed bend that is present in the section 14, whether it be manufactured as a single piece or consist of individual joints, is gradually straightened out as it goes down into the surface section 11. When individual joints are connected end-to-end, scribe marks are used to orient each connection so that the bend is in a single plane. When the upper end of the bend section 14 is at the wellhead 19, a coupling sub designed like the element 38 in FIG. 4, but larger in size, is attached thereto, and the running tool R is releasably attached to the coupling sub by an appropriate shear screw like 56. Then the lower joint of the small diameter running string 17 is threaded to the running tool R as at 52, and snubbing force is applied to push the bend section 14 on down through the surface section 11 and cause it to emerge from the coupling sub included in 15 and to project outward into the water saturated thickness t of the aquifer 13. In many cases the sand throughout such thickness is very unconsolidated and may be considered to have the consistency of "quick sand". Thus the bend section 14, as it emerges from the bottom of the surface section 11, will regain its original or normal curved shape as it is thrust into the aquifer 13. In an exemplary case where the water saturated thickness t is 100 ft., and the total thickness of the aquifer is 150 ft., a bend radius r of 90 ft. will position the lower coupling sub 31 about 10 ft. above the bottom of the aquifer 13, which is approximately in the middle of the lower 20% of the water saturated thickness thereof. As the coupling sub at the upper end of the bend section 14 is seated in the sub at the lower end of the surface section 11, the seal rings like 43 in FIG. 4 enter the seal bore like 35 to prevent fluid leakage, and stop shoulders like 41, 34 engage to prevent further downward movement. At this point a snap ring which is like 45 resiles radially outward and partially in a recess like 44 in FIG. 4A to latch the subs together. If any difficulty is encountered in pushing the bend section 14 into the water-saturated thickness of the aquifer 13, a surface facility can be used to pump water down the running string 17, through the bore of the bend section 14 and out its outer end in order to jet the same into the aquifer. Then the running string 17 is tensioned at the surface to shear a screw like 56 and release the running mandrel so that it and the running string can be withdrawn from the well.

In the final phase of the casing installation, the production section 20 having a desired length L which has been determined in accordance with FIG. 3 of U.S. application Ser. No. 07/888,007 is lowered into the surface section 11 as the individual joints thereof are connected end-to-end. The lower or outer end of the production section 20 can be bull plugged at 18, or if hydraulic jetting is required to place it in the horizontal position shown in FIG. 3, a small diameter plastic pipe section 82 as shown by the dash-dot-dash lines in FIG. 4 is employed to provide a wash pipe that extends from the threads 83 on the lower end of the running tool R to the seal bore 85 behind the nozzle opening 81 which is formed in the center of the plug 80. Such wash pipe can be positioned as the joints of the production section 20 are made up at the surface, or lowered into the production section when the running tool R is added to the top of the last joint. The running string 17 then is lowered until the lower end of the production section 20 enters the bend section 14, and then the running string is snubbed down to push the production section 20 around and through the bend section 20. When its outer end emerges from the coupling sub 31, water under pressure is pumped down the string 17, the wash pipe 82 and out of the nozzle 81 to provide a jetting action which will enable the production section to be advanced horizontally in the aquifer 13. When the mandrel 38 has been pushed into the companion sub 31 on the outer end of the bend section 14, the shoulders 34 and 41 stop further movement. The seal rings 43 will have entered the bore 35, and when the shoulders engage the snap ring 45 automatically engages in the groove 44 to provide a latched, fluid-tight connection. Upward force then is applied to the running string 17 to shear screw 56 so that the string, the running tool R, and the wash pipe 82 can be removed from the well.

To put the water well on production, a typical submersible pump (not shown) is installed, preferably near the inner end of the production section 20, and electrical power is used to pump the water to the surface that enters the production section through the perforations or slots 21. At the surface, the water is piped to an irrigation system in the event the well is being used for agricultural purposes, or to a water storage and supply facility when the water is to be used by a commercial or municipal utility district.

Of course it will be recognized that the plastic material of which the bend section 14 is made may tend to sink in the water-saturated portion of the aquifer 13, so that the outer end thereof would possibly sag below horizontal. To ensure that a line which is tangent to the curvature of the bend section 14 at its lower end is in fact substantially horizontal after the bend section 14 has been run, it may be desirable to initially close the outer end thereof by installing a fragile disc valve 90 or the like at the outer end of the tubular sub 31, as shown in FIG. 6. The valve 90 can be domed outward so that it holds inwardly directed pressure while maintaining the bore of the bend section 14 empty of fluids as it is being installed. Thus a substantial buoyancy force acts upward on the bend section 14 which tends to raise its outer end portion. A typical inclination survey then can be made of the bend section 14 to determine the angle of the above-mentioned axis with respect to a reference, such as the vertical. Consecutive volumes of water then are poured into the bend section 14 from the surface to reduce the buoyancy force, and the surveys are repeated between pourings until the said tangent line is indeed horizontally disposed, or at some small angle above the horizontal.

As the production section 20 is run as described above, its lower end ruptures the disc valve 90, shatters it into fragments, and passes on through it. When the section 20 has been extended completely outward, it will lie substantially horizontally. Of course where water jetting is used to advance the bend section 14 into position, the disc valve 90 and the foregoing procedure are not used.

Another way of ensuring that the production section 20 extends substantially horizontally as shown in FIG. 3 is to preform the bend section during its manufacture so that it provides a bend angle that is somewhat more than 90°. Then the bending moment about the upper coupling mechanism 15 due to its own net weight, i.e., as offset against the weight of the volume of the water saturated aquifer 13 that it displaces, plus the bending movement about the same point due to the net weight of the production string 20, provide a resultant or total bending moment which will dispose the length L of the production section 20 substantially horizontal.

If the production section 20 should need to be removed from the well at a later time for any reason, such as the installation of a different length thereof, the submersible pump is removed so that the retrieving tool 60 shown in FIG. 5 can be run into the well on the small diameter tubing 11 until the lower portion of the tool enters the bore 67 of the lower coupling mandrel 38. When the drill 64, 65 engages the chamfered upper surface 48, the snap ring 70 will resile outward into engagement with the upper portion of the elongated groove 71. Then the string 17 is turned to the right to drill away a majority of the upper section 40 of the sub 38, as well as the inner portion of the snap ring 45. The snap ring 45 is prevented from turning by the elements 49, 50 (FIG. 4A). The drilling stops when the lower snap ring 70 encounters the lower end face 73 of the elongated groove 71. Then the running string 17, the retrieving tool 60 and the sub 38 are picked up to engage the snap ring 70 with the upper face 72 of the groove 71, whereupon the production section 20 can be pulled from the well. Once the production section 20 is removed, the bend section 14 also can be removed in a like manner, if needed, for example to substitute another bend section which places the production section at a lesser or greater depth with respect to the bottom of the aquifer 13. When another production section 20 is run back in without removing the bend section 14, a new mandrel 38 is attached to the upper end thereof, and a new snap ring 45 is positioned in one of the additional grooves 59 or 59' so that it will latch into another radially aligned groove 59'or 59" in the outer sub 31 as the shoulders 34, 41 make contact. This is necessary since the remaining outer portion of the snap ring 45 will still be in the groove 44. Of course a new shear screw 56 is used to releasably attach the mandrel 38 to the running tool R. If both the production section 20 and the bend section 14 are removed, new mandrels 31, 38 can be used so that the snap ring 45 will latch into the same groove 44 as it entered during the original installation.

Another embodiment of a completion method in accordance with the present invention and the associated apparatus is shown in FIGS. 7 and 8. For purposes of simplicity, these figures have a dash-dot-dash line to depict that part of the bend section and of the running string which curves from the vertical to the horizontal. The lower end of the surface section 11 is provided with a no-go adapter sub 100 having an inwardly directed shoulder 101. The shoulder 101 can have an upper surface 102 that inclines upward and outward. The inner surface of the shoulder 101 carries suitable seal or packing rings 103, and when the inclined surface 102 is used, it also can be provided with seals (not shown). The upper end of the adapter sub 100 is attached in a suitable manner at 105 to the lower end of the surface section 11.

The upper end of the preformed bend section 14', which is shown after it has been lowered through the surface section 11 and into the aquifer 13, also is fitted with an adapter sub 107. The sub 107 has an outwardly directed shoulder 108 which has an external diameter that is only slightly smaller than the inner wall surface 109 of the surface section 11. The shoulder 108 carries seal rings 110 which provide a pack-off therebetween, and an inclined surface 111 can be provided which has an inclination that matches the inclination of the surface 102 on the sub 100. The outer diameter of the bend section 14' below the adapter sub 107 is only slightly smaller than the inner diameter of the shoulder 101 on the sub 100 so that the seals 103 prevent fluid leakage therebetween. Since it is conceivable that under some circumstances water might be present within the lower portion of the surface section 11 as the bend section 14' is being run, one or more bleed ports 112 can be provided through the wall of the adapter sub 100 above the shoulder 101 which allow the water to escape.

The lower end of the preformed bend section 14' also is provided with an adapter sub 115 having an inwardly directed annular shoulder 116, which carries packing rings 117. Hereagain a conical bore 119 can be used which carries seal or packing rings, if desired. A retrievable jetting tool 130 having a torpedo-shaped outer surface 131 includes a housing 140 which has a cylindrical mid-portion 132 that is engaged by the seal rings 117, and an inner portion 133 having an outwardly flared or inclined surface 134 which engages the conical surface 119. A central bore 135 in the housing 140 has threads 136 which connect with companion threads on the outer end of the running string 17, which in this embodiment extends from the outer end of the bend section 14' all the way to the surface so that pushing forces are applied to the outer end of the bend section rather than its top. A reduced diameter bore 137 leads from the bore 135 to a nozzle 138 that is formed centrally in the front nose of the housing 140. A plurality of circulatory ports 141 communicate the outside of the housing 130 with the annular space 142 between the bend section 14' and the running string 17. The ports 141 and the space 142 allow sand and gravel particles which are dislodged by jetting to be circulated to the surface where they can be removed by suitable means from the water. Of course reverse circulation can be done by pumping water down the annular space 142 and out the ports 141 and allowing the water to return to the surface via the bore of the running string 17.

The embodiment of the invention shown in FIG. 7 has the advantage that the positioning of the bend section 17' can be stopped when inclination surveys show that the central axis of its lower adapter sub 115 is directed substantially horizontally, even though its upper adapter sub 107 has not reached the no-go sub 100 on the lower end of the surface section 11. Of course when an inclination survey is being run, the running string 17 and the jetting tool 130 are removed from the well. If the survey shows that additional extension of the bend section 14' out the lower end of the surface section 11 is needed to achieve the horizontal position mentioned above, the jetting tool 130 is run back in at the outer end of the running string 17 and engaged with the outer adapter sub 115 so that further jetting and snubbing can be done to push the outer end of the bend section 14' further outward.

The installation of the water production section 20' is shown in FIG. 8. As distinguished from the previous embodiment, the production section 20' extends from the top of the well 10 down through the surface section 11, around the bend section 14' and out the outer end of the bend section 14' for a distance L into the aquifer 13. Only the length L of the production section 20' has water entry ports 21.

The outer end of the production portion 20' is permanently connected at 120 to a torpedo or nose member 122 having a substantially bullet-shaped outer surface 123. The nose member 122 has an inner bore 124 which receives the end portion of the running string 17, and a reduced diameter bore 125 which lead to a central outlet nozzle 126. A plurality of circumferentially spaced ports 127 in the nose member 122 which communicate with the annular space 128 between the running string 17 and the production section 20' enable water that is pumped from the surface down through the running string and out the nozzle 12, for jetting purposes, to circulate back upwardly to the surface. Reverse circulation, as described above, also can be employed. Although the water entry ports 21 also may permit some circulation return of water during jetting, these ports typically are relatively small so that the majority of the circulation occurs via the ports 126. The seal rings 117 on the adapter sub 115 engage the outer wall of the production section 20' to prevent fluid leakage, so that section circulation is confined to the space 128.

To complete a water well using the system and components illustrated in FIGS. 7 and 8, the well bore 10 is drilled down to about the level of the air-water interface 12, and the surface section 11 of casing having the adapter sub 100 on its lower end is run and set. Then the preformed bend section 14' having the upper and lower adapter subs 107 and 115 is pushed down through the surface section 11 using the running string 17, the jetting tool 130, and its engagement with the shoulder 116 on the lower adapter sub 115 to force the bend section downward. When the jetting tool 130 emerges from the lower end of the adapter sub 101, water is pumped down through the running string 17 so that a jet issues from the nozzle 138 and washes away sand and gravel particles ahead of the tool 130 and the sub 115. As the placement operation continues, that part of the bend section 14' which has emerged from the sub 101 on the lower end of the surface section 11 gradually regains its preformed curvature so that its outer end gradually attains the horizontal. At a point in time when the upper sub 107 on the bend section 14' is still well above the sub 100, pumping is stopped and the running string 17 and the jetting tool 130 are pulled out of the well so there an inclination survey can be made. If this survey shows that further extension of the bend section 14' into the aquifer 13 is needed, then the jetting tool 130 and running string 17 are reinstalled so that additional jetting and snubbing can be performed to lengthen the borehole. The removal and survey steps are repeated at intervals until the survey tool shows that the longitudinal axis of the sub 115 substantially horizontal. This completes the installation of the bend section 14', even though the shoulders 111 and 102 are not engaged as shown in FIG. 7. The seals 10 and 103 still function to prevent any leakage in the absence of such engagement.

To place the production string 20' in position in the aquifer 13, the lower end of the running string 17 is connected to the nose member 122 by a shear pin or the like (not shown), and the string is used to lower the bottom portion of the production string down through the surface section 11. Then such lower portion is pushed around the bend section 14' and out the outer end thereof. When the nose member 122 emerges from the adapter sub 115, water again is pumped down the running string 17 and out the nozzle 126 to wash out a horizontal path as the production portion of the string 20' is forced outward over the distance L by the running string 17. Loose particles such as sand and small gravel materials can enter the annulus 128 between the string 17 and the production section 120 via ports 127 and be circulated up to the surface for removal by settings or by an appropriate shaker device. When the length L has been positioned, an upward force applied at the surface to the running string 17 will shear the pin by which the nose member 122 is attached, and allow the running string to be removed from the well, leaving the nose member in place at the outer end of the production section. Then a submersible pump (not shown) is installed to put the well on a high flow rate production.

It will be appreciated that although the use of a bend section having a preformed curvature can be used to achieve the horizontal for the water production section, a running string having a lower section that is preformed to provide the 90° bend could be used in combination with a relatively flexible bend section that would conform its curvature to that of the lower portion of the running string as it emerges from the bottom of the casing section 11. Since the lower end of section 14' is being pushed downward and outward, a flexible bend section would merely follow the curvature established by the lower portion of the running string as hole formation continues as a result of jetting and snubbing.

It now will be recognized that new and improved methods and apparatus have been disclosed by which a high flow rate water well can be completed in a manner such that its water production section extends substantially horizontally into an aquifer. Numerous changes or modifications can be made to the present invention without departing from the inventive concepts involved. For example other automatic latch mechanisms that are the functional equivalent of the snap rings can be employed, and other means such as a pin that is equivalent to the shear screw can be used to releasably secure the various members to one another. As noted above, the bend section can be a single preformed piece of plastic pipe, or it can be assembled as it is run from preformed joints of curved plastic pipe using scribe lines to assemble the same so that the bend lies in a single plane. Where the running string has a preformed lower section that places a flexible bend section along the proper curvature, scribe means also are used at the connections between individual pipe joints to ensure the same alignment. Various sand control means such as a screen can be located inside the production section 20 to inhibit entry of sand particles as the well is pumped at a high flow rate. Thus the aim of the following claims is to cover all such changes and modifications that fall within the true spirit and scope of the present invention.

What is claimed is:

1. A casing assembly for use in completing a water well into an aquifer having an air-water interface, comprising: a surface section that extends from the top of said well down substantially to said interface, said surface section having a first diameter; a preformed resilient bend section having its upper end coupled to the lower end of said surface section and having a radius of curvature that disposes the outer end thereof substantially horizontal, said bend section being adapted to be run through said surface section in a straightened condition and out said lower end of said surface section into the aquifer where said bend section assumes its original curved shape, said bend section having a second diameter that is less than said first diameter; a production section having water entry ports and being coupled to said outer end of said bend section and extending substantially horizontally therefrom, said production section having a third diameter that is less than said second diameter.

2. The assembly of claim 1 further including first means for coupling said upper end of said bend section to said lower end of said surface section, said coupling means including inner and outer tubular members, and automatic latch means for attaching said members to one another.

3. The assembly of claim 2 further including second means for coupling said inner end of said production section to said outer end of said bend section, said coupling means including inner and outer tubular members, and automatic latch means for attaching said members to one another.

4. The assembly of claim 2 wherein said latch means includes groove means on each of said members adapted to be radially aligned by telescoping movement of said members, and split ring means carried by one of said groove means and arranged to resile laterally partially into the other of said groove means when said groove means are radially aligned; and further including stop means for stopping telescoping movement of said members when said groove means are in alignment.

5. The assembly of claim 3 wherein said latch means includes groove means on each of said members adapted to be radially aligned during telescoping movement of said members, and split ring means carried by one of said groove means and arranged to resile laterally partially into the other of said groove means when said groove means are radially aligned; and further including stop means for stopping telescoping movement of said members when said groove means are in alignment.

6. The assembly of claim 2 wherein said first coupling means includes seal means providing a leak-proof connection between said members.

7. The assembly of claim 3 wherein said second coupling means includes seal means providing a leak-proof connection between said members.

8. The assembly of claim 1 further including a running tool for use in positioning said upper end of said bend section adjacent said lower end of said surface section, said running tool including a tubular mandrel having means at its upper end for connecting said mandrel to a running string of pipe, said mandrel having an enlarged diameter upper portion sized to slide through said casing section and a reduced diameter lower portion sized for reception in said upper end of said bend section; and means on said lower portion for releasably attaching said mandrel to said upper end of said bend section.

9. The assembly of claim 8 wherein said upper portion has a downwardly and inwardly inclined surface adapted to engage a companion surface on said upper end of said bend section.

10. The assembly of claim 8 further including means adjacent the lower end of said tubular mandrel for connecting said lower end to a wash pipe.

11. The assembly of claim 2 further including a retrieving tool for use in releasing said latch means to enable said bend section to be removed from the well, said retrieving tool comprising: a tubular mandrel having means at its upper end for connecting said mandrel to a running string of pipe, said mandrel having an enlarged diameter upper portion and a reduced diameter lower portion; means forming a cutter on the outer periphery of said upper portion and arranged to disable said latch means in response to rotation of said running string; external annular groove means in said lower portion; contractible and expansible catch means mounted in said groove means; and an elongated internal groove means in said outer tubular member, said catch means expanding into said groove means to catch said outer tubular member as said cutter means disables said latch means.

12. The assembly of claim 11 wherein said elongated groove means has oppositely facing upper and lower end surfaces, said catch means being a split ring arranged to engage said lower end surface to stop the drilling by said cutter means, said ring being arranged to engage said upper end surface in response to upward movement of said mandrel.

* * * * *